United States Patent
Visser

(10) Patent No.: US 6,726,340 B1
(45) Date of Patent: Apr. 27, 2004

(54) REAR VIEW MIRROR APPARATUS

(76) Inventor: Cornelis Visser, P.O. Box 443, Krugersdorp 1740 (ZA)

( * ) Notice: Subject to any disclaimer, the term of this patent is extended or adjusted under 35 U.S.C. 154(b) by 0 days.

(21) Appl. No.: 10/171,894

(22) Filed: Jun. 14, 2002

(51) Int. Cl.[7] .............................................. G02B 7/182
(52) U.S. Cl. ..................................................... 359/872
(58) Field of Search ................................. 359/872, 838, 359/871, 873, 874, 875, 876

(56) References Cited

U.S. PATENT DOCUMENTS

| 1,617,270 | A |   | 2/1927  | Paul |
|---|---|---|---|---|
| 3,058,395 | A |   | 10/1962 | Mattsson |
| 3,704,063 | A |   | 11/1972 | Guthrie |
| 3,773,406 | A |   | 11/1973 | Baumgardner et al. |
| 4,435,044 | A |   | 3/1984  | Hanin |
| 4,527,860 | A | * | 7/1985  | Roof ........................... 359/606 |
| D329,415  | S |   | 9/1992  | Rhoo |
| 5,313,337 | A | * | 5/1994  | Byers .......................... 359/872 |
| 6,250,148 | B1| * | 6/2001  | Lynam ..................... 73/170.17 |

\* cited by examiner

*Primary Examiner*—Euncha Cherry

(57) ABSTRACT

A rear view mirror apparatus for aiding a driver in viewing an area directly behind the vehicle. The rear view mirror apparatus includes a plurality of stanchion portions being designed for being coupled to a trunk lid of the vehicle whereby the stanchion portions are positioned proximate a rear edge of the trunk lid. A mirror assembly is coupled to the stanchion portions. The mirror assembly is positioned between the stanchion portions. The mirror assembly is rotatable with respect to the stanchion portions whereby the mirror assembly optically reflects a virtual image of the area directly behind the vehicle to be viewed by the driver.

10 Claims, 3 Drawing Sheets

REAR VIEW MIRROR APPARATUS

BACKGROUND OF THE INVENTION

1. Field of the Invention

The present invention relates to automobile mirror systems and more particularly pertains to a new rear view mirror apparatus for aiding a driver in viewing an area directly behind the vehicle.

2. Description of the Prior Art

The use of automobile mirror systems is known in the prior art. U.S. Pat. No. 4,435,044 describes an assembly for allowing a viewer to view directly behind the vehicle. Another type of automobile mirror system is U.S. Pat. No. 1,617,270 having a plurality of mirrors positioned in the roof of the vehicle to allow a user to view the entire width of the road behind the vehicle. U.S. Pat. No. 3,704,063 has a device with a plurality of mirrors mounted to the top of a panel truck to allow driver to look up and see directly behind the vehicle. U.S. Pat. No. 3,773,406 has a periscope system for allowing a user to the area behind a vehicle. U.S. Pat. No. 3,058,395 has a periscope mounted to the dash of a vehicle to allow a user to view vehicles behind the vehicle. U.S. Pat. No. Des. 329,415 shows a auxiliary rear view mirror.

SUMMARY OF THE INVENTION

An object of the present invention is to provide a new rear view mirror apparatus that allows a driver to see objects that are directly behind the vehicle but not visible over the rear of the vehicle.

Even still another object of the present invention is to provide a new rear view mirror apparatus that facilitates parking by allowing a driver to see when the vehicle is getting close to a stationary object.

To this end, the present invention generally comprises a plurality of stanchion portions being designed for being coupled to a trunk lid of the vehicle whereby the stanchion portions are positioned proximate a rear edge of the trunk lid. A mirror assembly is coupled to the stanchion portions. The mirror assembly is positioned between the stanchion portions. The mirror assembly is rotatable with respect to the stanchion portions whereby the mirror assembly optically reflects a virtual image of the area directly behind the vehicle to be viewed by the driver.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
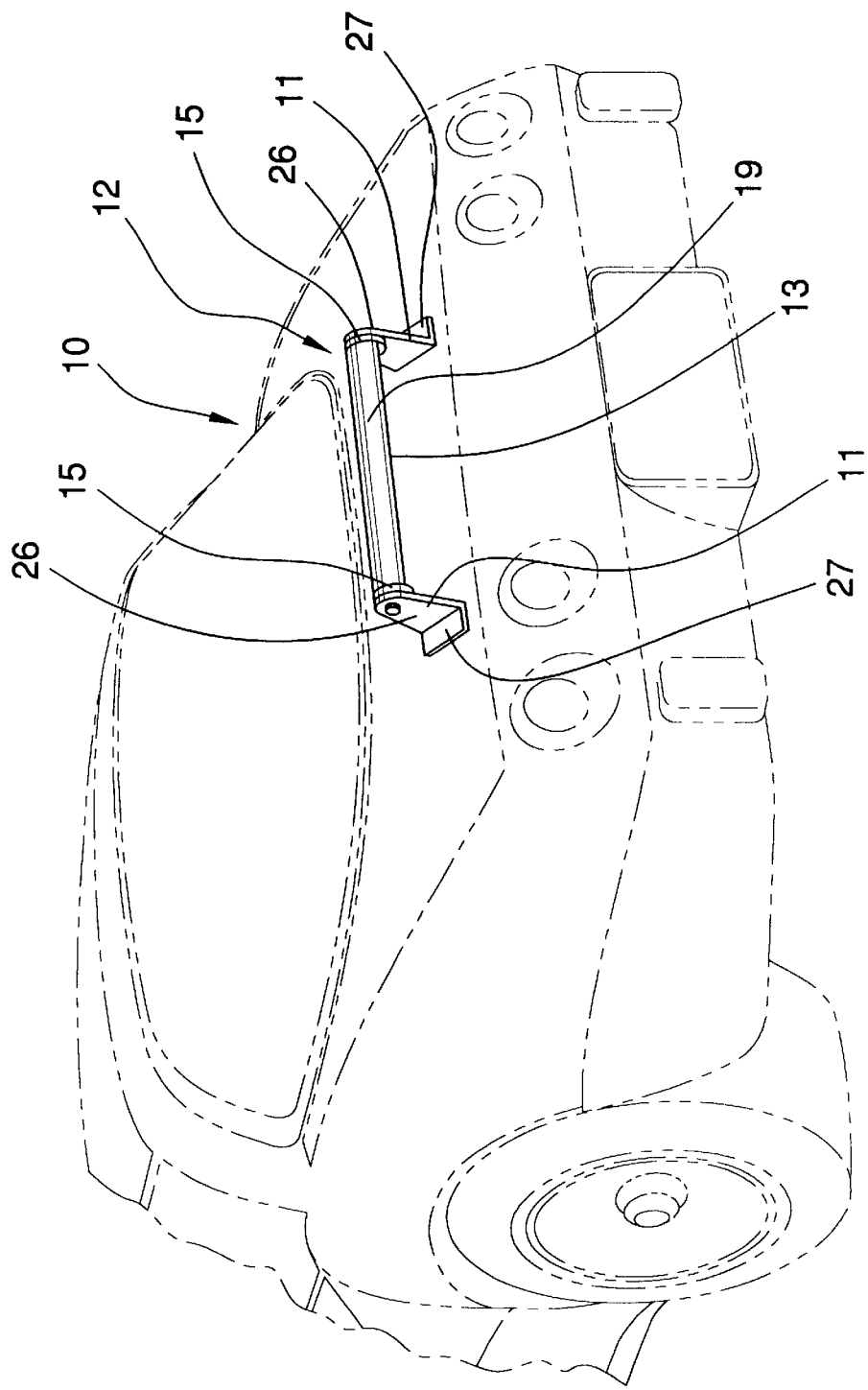
FIG. 1 is a perspective view of a new rear view mirror apparatus according to the present invention shown mounted on the vehicle.
Figure 2:
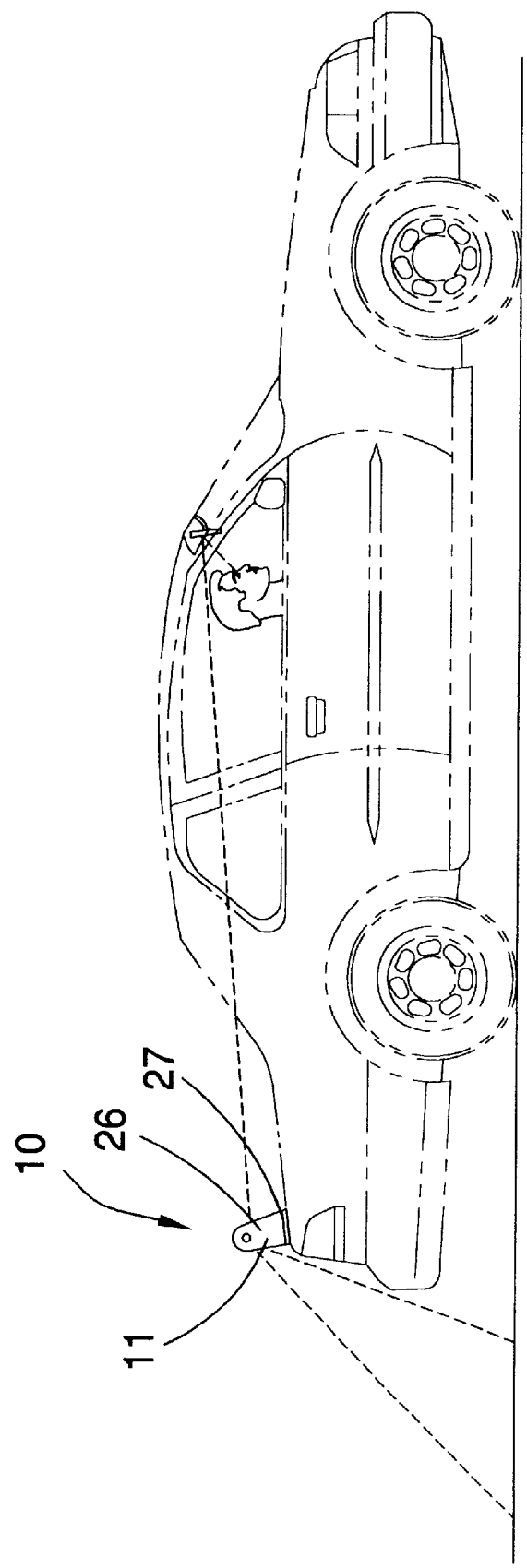
FIG. 2 is a side view of the present invention shown in use.
Figure 3:
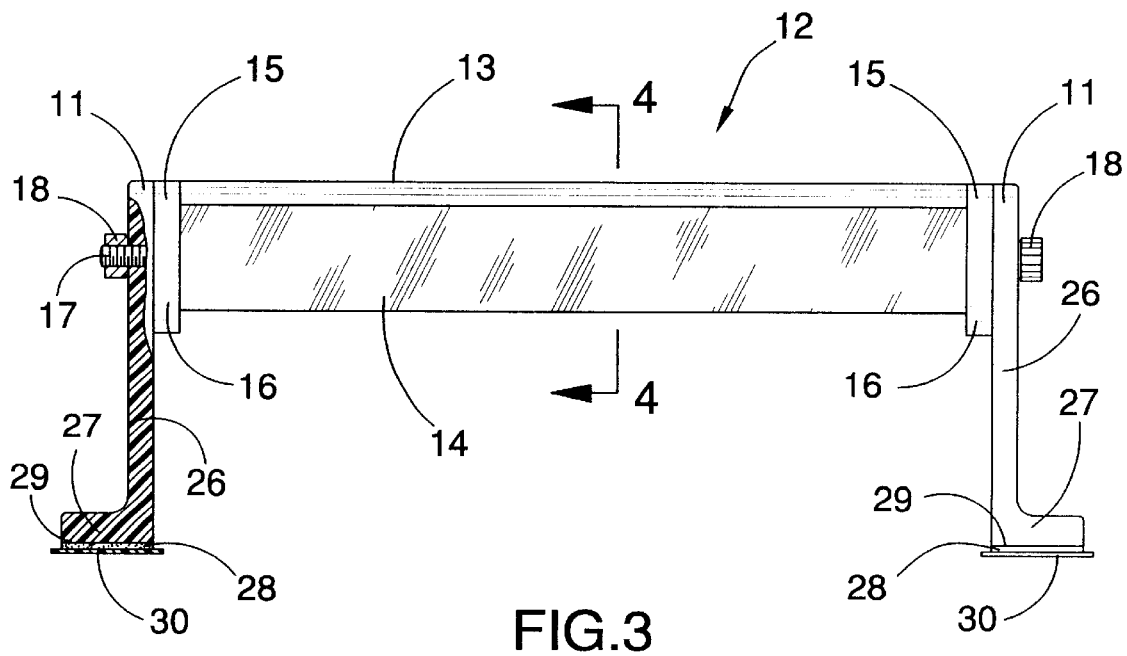
FIG. 3 is a front view of the present invention with partial crosssection of one of the stanchion portions.
Figure 4:
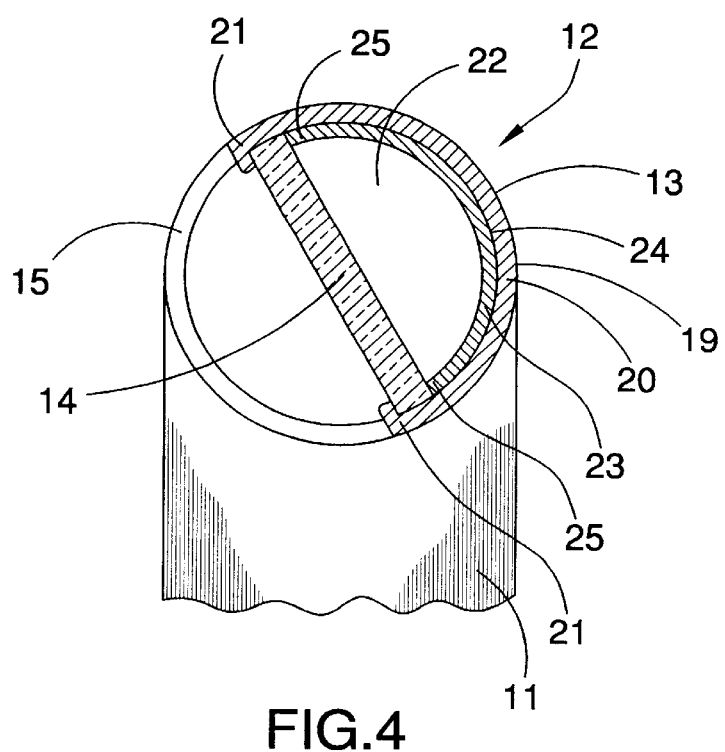
FIG. 4 is a cross-sectional view of the present invention taken along line 4—4 of FIG. 3.

With reference now to the drawings, and in particular to FIGS. 1 through 4 thereof, a new rear view mirror apparatus embodying the principles and concepts of the present invention and generally designated by the reference numeral 10 will be described.

As best illustrated in FIGS. 1 through 4, the rear view mirror apparatus 10 generally comprises a plurality of stanchion portions 11 being designed for being coupled to a trunk lid of the vehicle whereby the stanchion portions 11 are positioned proximate a rear edge of the trunk lid.

A mirror assembly 12 is coupled to the stanchion portions 11. The mirror assembly 12 is positioned between the stanchion portions 11. The mirror assembly 12 is rotatable with respect to the stanchion portions 11 whereby the mirror assembly 12 optically reflects a virtual image of the area directly behind the vehicle to be viewed by the driver.

The mirror assembly 12 comprises a body portion 13. The body portion 13 is coupled between the stanchion members. The mirror assembly 12 comprises a reflective portion 14. The reflective portion 14 is coupled to the body portion 13 whereby the body portion 13 is rotated with respect to the stanchion portion for changing an angle of reflection of the reflective portion 14 of the area behind the vehicle.

The body portion 13 comprises a pair of end members 15. Each of the end members 15 is rotatably coupled to the stanchion portions 11 whereby the rotation of the end members 15 with respect to the stanchion portions 11 is for changing the angle of reflection of the reflective portion 14.

Each of the end members 15 comprises a main portion 16 and an extension portion 17. The extension portion 17 outwardly extends from the main portion 16 of the associated one of the end members 15. The extension portion 17 of each of the end members 15 extends through an associated one of the stanchion portions 11.

Each of a plurality of fastener members 18 is selectively engagable to the extension portion 17 of one of the end members 15. The fastener member is for compressing the associated one of the stanchion portions 11 between the associated one of the fastener members 18 and the associated one of the main portion 16s for inhibiting rotation of the mirror assembly 12 with respect to the stanchion portion when the fastener members 18 engage the extension portion 17 of each of the end members 15.

The body portion 13 comprises a shell member 19. The shell member 19 is coupled between the end members 15 of the body portion 13. The shell member 19 is for receiving the reflective portion 14 of the body portion 13. The shell member 19 is for maintaining the angle of reflection of the reflective portion 14.

The shell member 19 comprises an arcuate wall 20. The arcuate wall 20 has a pair of tabs. The tabs inwardly extend from opposing ends 21 of the arcuate wall 20. The reflective portion 14 is positioned in a cavity 22 of the shell member 19 defined by the arcuate wall 20 whereby the reflective portion 14 abuts the tabs of the arcuate wall 20. The tabs are for retaining the reflective portion 14 in the cavity 22 of the arcuate wall 20.

The body portion 13 comprises a retaining member 23. The retaining member 23 arcuately extends along an interior surface 24 of the arcuate wall 20. The retaining member 23 comprises a pair of free ends 25. The free ends 25 engage the reflective portion 14 opposite the tabs of the arcuate wall 20 whereby the retaining member 23 biases the reflective member against the tabs of the arcuate wall 20 for inhibiting inadvertent movement of the reflective portion 14 in the cavity 22 of the shell member 19.

Each of the stanchion portions 11 comprises a mounting member 26 and a flange member 27. The mounting member 26 of the stanchion portion is coupled to the mirror assembly 12. The flange member 27 outwardly extends from the mounting member 26 opposite the mirror assembly 12. The flange member 27 is designed for being coupled to the vehicle.

Each of the stanchion portions 11 comprises an adhesive 28. The adhesive 28 is coupled to a bottom surface 29 of the flange member 27 of the associated one of the stanchion portions 11. The adhesive 28 is for adhering the flange member 27 of the associated one of the stanchion portions 11 to the vehicle.

Each of the stanchion portions 11 comprises a sheet member 30. The sheet member 30 is selectively coupled to the adhesive 28 opposite the flange member 27 of the associated one of the stanchion portions 11. The sheet member 30 is for inhibiting inadvertent adhering of objects to the adhesive 28. The sheet member 30 is selectively removable from the adhesive 28 for allowing the adhesive 28 to adhere to the vehicle.

In use, the user removes the sheet member 30 from the adhesive 28 of each of the stanchion portions 11. The stanchion portions 11 are then positioned so that each of the stanchion portions 11 is equal distance from a longitudinal axis of the vehicle. The stanchion portions 11 are then pressed down to adhere the adhesive 28 to the vehicle. The fastener members 18 are then loosened to allow the body portion 13 to be rotated with respect the stanchion portions 11. The body portion 13 is then adjusted to allow the driver of the vehicle to view an area directly behind the vehicle either by turning the head or viewing in the rear view mirror. The fastener members 18 are then tightened up and the body portion 13 is held in place.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rear view mirror apparatus for viewing an area directly behind a vehicle by the driver of the vehicle, the rear view mirror apparatus comprising:

a plurality of stanchion portions being adapted for being coupled to a trunk lid of the vehicle such that said stanchion portions are positioned proximate a rear edge of the trunk lid;

a mirror assembly being coupled to said stanchion portions, said mirror assembly being positioned between said stanchion portions, said mirror assembly being rotatable with respect to said stanchion portions such that said mirror assembly optically reflects a virtual image of the area directly behind the vehicle to be viewed by the driver; and said mirror assembly comprising a body portion, said body portion being coupled between said stanchion members, said mirror assembly comprising a reflective portion, said reflective portion being coupled to said body portion such that said body portion is rotated with respect to said stanchion portion for changing an angle of reflection of said reflective portion of the area behind the vehicle, said reflective portion being planar and having a substantially consistent thickness across a length and a width of said reflective portion such that said reflective portion does not distort images viewed in said reflective portion.

2. The rear view mirror apparatus as set forth in claim 1, further comprising:

each of said stanchion portions comprising a mounting member and a flange member, said mounting member of said stanchion portion being coupled to said mirror assembly, said flange member outwardly extending from said mounting member opposite said mirror assembly, said flange member being adapted for being coupled to the vehicle.

3. The rear view mirror apparatus as set forth in claim 1, further comprising:

said body portion comprising a pair of end members, each of said end members being rotatably coupled to said stanchion portions such that the rotation of said end members with respect to said stanchion portions is for changing the angle of reflection of said reflective portion.

4. The rear view mirror apparatus as set forth in claim 3, further comprising:

each of said end members comprising a main portion and an extension portion, said extension portion outwardly extending from said main portion of the associated one of said end members, said extension portion of each of said end members extending through an associated one of said stanchion portions; and each of a plurality of fastener members being selectively engagable to said extension portion of one of said end members, said fastener member being for compressing the associated one of said stanchion portions between the associated one of said fastener members and the associated one of said main portions for inhibiting rotation of said mirror assembly with respect to said stanchion portion when said fastener members engage said extension portion of each of said end members.

5. The rear view mirror apparatus as set forth in claim 3, further comprising:

said body portion comprising a shell member, said shell member being coupled between said end members of said body portion, said shell member being for receiving said reflective portion of said body portion, said shell member being for maintaining the angle of reflection of said reflective portion.

6. The rear view mirror apparatus as set forth in claim 5, further comprising:

said shell member comprising an arcuate wall, said arcuate wall having a pair of tabs, said tabs inwardly extending from opposing ends of said arcuate wall, said reflective portion being positioned in a cavity of said shell member defined by said arcuate wall such that said reflective portion abuts said tabs of said arcuate wall, said tabs being for retaining said reflective portion in said cavity of said arcuate wall.

7. The rear view mirror apparatus as set forth in claim 6, further comprising:

said body portion comprising a retaining member, said retaining member arcuately extending along an interior surface of said arcuate wall, said retaining member comprising a pair of free ends, said free ends engaging said reflective portion opposite said tabs of said arcuate wall such that said retaining member biases said reflective member against said tabs of said arcuate wall for inhibiting inadvertent movement of said reflective portion in said cavity of said shell member.

8. The rear view mirror apparatus as set forth in claim 2, further comprising:

each of said stanchion portions comprising an adhesive, said adhesive being coupled to a bottom surface of said flange member of the associated one of said stanchion portions, said adhesive being for adhering said flange member of the associated one of said stanchion portions to the vehicle.

9. The rear view mirror apparatus as set forth in claim 8, further comprising:

each of said stanchion portions comprising a sheet member, said sheet member being selectively coupled to said adhesive opposite said flange member of the associated one of said stanchion portions, said sheet member being for inhibiting inadvertent adhering of objects to said adhesive, said sheet member being selectively removable from said adhesive for allowing said adhesive to adhere to the vehicle.

10. A rear view mirror apparatus for viewing an area directly behind a vehicle by the driver of the vehicle, the rear view mirror apparatus comprising:

a plurality of stanchion portions being adapted for being coupled to a trunk lid of the vehicle such that said stanchion portions are positioned proximate a rear edge of the trunk lid;

a mirror assembly being coupled to said stanchion portions, said mirror assembly being positioned between said stanchion portions, said mirror assembly being rotatable with respect to said stanchion portions such that said mirror assembly optically reflects a virtual image of the area directly behind the vehicle to be viewed by the driver;

said mirror assembly comprising a body portion, said body portion being coupled between said stanchion members, said mirror assembly comprising a reflective portion, said reflective portion being coupled to said body portion such that said body portion is rotated with respect to said stanchion portion for changing an angle of reflection of said reflective portion of the area behind the vehicle, said reflective portion being planar and having a substantially consistent thickness across a length and a width of said reflective portion such that said reflective portion does not distort images viewed in said reflective portion;

said body portion comprising a pair of end members, each of said end members being rotatably coupled to said stanchion portions such that the rotation of said end members with respect to said stanchion portions is for changing the angle of reflection of said reflective portion;

each of said end members comprising a main portion and an extension portion, said extension portion outwardly extending from said main portion of the associated one of said end members, said extension portion of each of said end members extending through an associated one of said stanchion portions;

each of a plurality of fastener members being selectively engagable to said extension portion of one of said end members, said fastener member being for compressing the associated one of said stanchion portions between the associated one of said fastener members and the associated one of said main portions for inhibiting rotation of said mirror assembly with respect to said stanchion portion when said fastener members engage said extension portion of each of said end members;

said body portion comprising a shell member, said shell member being coupled between said end members of said body portion, said shell member being for receiving said reflective portion of said body portion, said shell member being for maintaining the angle of reflection of said reflective portion;

said shell member comprising an arcuate wall, said arcuate wall having a pair of tabs, said tabs inwardly extending from opposing ends of said arcuate wall, said reflective portion being positioned in a cavity of said shell member defined by said arcuate wall such that said reflective portion abuts said tabs of said arcuate wall, said tabs being for retaining said reflective portion in said cavity of said arcuate wall;

said body portion comprising a retaining member, said retaining member arcuately extending along an interior surface of said arcuate wall, said retaining member comprising a pair of free ends, said free ends engaging said reflective portion opposite said tabs of said arcuate wall such that said retaining member biases said reflective member against said tabs of said arcuate wall for inhibiting inadvertent movement of said reflective portion in said cavity of said shell member;

each of said stanchion portions comprising a mounting member and a flange member, said mounting member of said stanchion portion being coupled to said mirror assembly, said flange member outwardly extending from said mounting member opposite said mirror assembly, said flange member being adapted for being coupled to the vehicle;

each of said stanchion portions comprising an adhesive, said adhesive being coupled to a bottom surface of said flange member of the associated one of said stanchion portions, said adhesive being for adhering said flange member of the associated one of said stanchion portions to the vehicle; and each of said stanchion portions comprising a sheet member, said sheet member being selectively coupled to said adhesive opposite said flange member of the associated one of said stanchion portions, said sheet member being for inhibiting inadvertent adhering of objects to said adhesive, said sheet member being selectively removable from said adhesive for allowing said adhesive to adhere to the vehicle.

* * * * *